United States Patent
Jaradi et al.

(10) Patent No.: US 12,454,242 B2
(45) Date of Patent: Oct. 28, 2025

(54) VEHICLE SEAT AND SEATBELT ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 194 days.

(21) Appl. No.: 18/356,392

(22) Filed: Jul. 21, 2023

(65) Prior Publication Data

US 2025/0026304 A1     Jan. 23, 2025

(51) Int. Cl.
  *B60R 22/20* (2006.01)
  *B60R 22/18* (2006.01)
  *B60R 22/26* (2006.01)
  *B60R 22/48* (2006.01)

(52) U.S. Cl.
  CPC .............. *B60R 22/20* (2013.01); *B60R 22/26* (2013.01); *B60R 2022/1818* (2013.01); *B60R 2022/4816* (2013.01); *B60R 2022/4858* (2013.01)

(58) Field of Classification Search
  CPC .... B60R 2022/4816; B60R 2022/4858; B60R 22/20; B60R 22/26; B60R 2022/1818
  See application file for complete search history.

(56) References Cited

U.S. PATENT DOCUMENTS

| | | | | |
|---|---|---|---|---|
| 3,761,127 A | * | 9/1973 | Giese | B60R 22/26 296/68.1 |
| 3,822,915 A | * | 7/1974 | Colucci | B60R 22/02 280/806 |
| 5,823,627 A | * | 10/1998 | Viano | B60N 2/688 297/483 |
| 6,145,881 A | * | 11/2000 | Miller, III | B60R 22/20 280/808 |
| 6,267,409 B1 | | 7/2001 | Townsend et al. | |
| 6,655,744 B2 | | 12/2003 | Petri et al. | |
| 7,980,635 B2 | | 7/2011 | Matsushita | |
| 8,042,866 B2 | | 10/2011 | Kling et al. | |
| 9,302,645 B1 | | 4/2016 | Shenaq et al. | |
| 9,783,155 B2 | | 10/2017 | Kondo et al. | |

* cited by examiner

*Primary Examiner* — Milton Nelson, Jr.
(74) *Attorney, Agent, or Firm* — Frank A. MacKenzie; Brooks Kushman P.C.

(57) ABSTRACT

A seat assembly includes a seatback having a top end. The seat assembly includes an arm supported by the seatback, and movable from a stowed position to a deployed position. The seat assembly includes a first webbing guide supported by the seatback at the top end. The seat assembly includes a second webbing guide fixed to and movable with the arm, the second webbing guide at the top end of the seatback with the arm at the stowed position, and the second webbing guide spaced from the seatback in a seat-forward direction with the arm at the deployed position. The seat assembly includes a retractor supported by the seatback at the top end. The seat assembly includes a webbing extending from the retractor through the first webbing guide and the second webbing guide.

20 Claims, 6 Drawing Sheets

VEHICLE SEAT AND SEATBELT ASSEMBLY

BACKGROUND

A vehicle may include a seatbelt assembly. The seatbelt assembly may include a seatbelt retractor and a webbing retractably payable from the seatbelt retractor. The seatbelt assembly may include an anchor coupled to the webbing, and a clip that engages a buckle. The seatbelt assembly may be disposed adjacent to a seat of the vehicle. The webbing may extend continuously from the seatbelt retractor to the anchor. For example, one end of the webbing feeds into the seatbelt retractor, and the other end of the webbing is fixed to the anchor.

It is contemplated that future regulatory and technology evolution may allow for safe and permissible use of seat assemblies that are selectively rotatable to different facing positions, and in such examples, the seatbelt assembly may be a seat-integrated restraint (SIR) in which various components of the seatbelt assembly, e.g., the seatbelt retractor and the anchor, are fixed to the seat assembly.

DETAILED DESCRIPTION

A seat assembly includes a seatback having a top end. The seat assembly includes an arm supported by the seatback and movable from a stowed position to a deployed position. The seat assembly includes a first webbing guide supported by the seatback at the top end. The seat assembly includes a second webbing guide fixed to and movable with the arm, the second webbing guide being at the top end of the seatback when the arm is at the stowed position, and the second webbing guide being spaced from the seatback in a seat-forward direction when the arm is at the deployed position. The assembly includes a retractor supported by the seatback at the top end. The assembly includes a webbing extending from the retractor through the first webbing guide and the second webbing guide.

The seatback may have a side bolster, and the arm may be outboard of the side bolster.

The seatback may include a cover, and the arm and the retractor may be external of the cover.

The seat assembly may include a housing supported by the seatback at the top end and enclosing the retractor, the housing having a front panel that includes the first webbing guide.

The seat assembly may include an actuator supported by the seatback, the actuator configured to move the arm.

The seat assembly may include a computer having a processor and a memory storing instructions executable by the processor to command the actuator to move the arm from the stowed position to the deployed position and from the deployed position to the stowed position.

The instructions may include instructions to move the arm to the deployed position in response to detecting that the seat assembly is occupied.

The instructions may include instructions to move the arm to the stowed position in response to detecting that a latch plate is engaged with a buckle of the seat assembly.

The first webbing guide may abut the second webbing guide with the arm at the stowed position.

The first webbing guide may be aligned with the second webbing guide with the arm at the stowed position.

A seat assembly may include a seatback having a side bolster and a top end. The seat assembly includes an arm supported by the seatback, the arm outboard of the side bolster and movable from a stowed position to a deployed position. The seat assembly includes a retractor supported by the seatback. The seat assembly includes a first webbing guide supported by the seatback at the top end. The seat assembly includes a second webbing guide fixed to and movable with the arm, the second webbing guide at the top end of the seatback with the arm at the stowed position, and the second webbing guide spaced from the seatback in a seat-forward direction with the arm at the deployed position. The seat assembly includes a webbing extending from the retractor through the first webbing guide and the second webbing guide.

The seatback may include a cover and the retractor may be internal of the cover.

The seatback may include a cover and the retractor may be external of the cover.

The seat assembly may include a housing supported by the seatback and enclosing the retractor, the housing having a front panel that includes the first webbing guide.

The seat assembly may include an actuator supported by the seatback, the actuator configured to move the arm.

The seat assembly may include a computer having a processor and a memory storing instructions executable by the processor to command the actuator to move the arm from the stowed position to the deployed position and from the deployed position to the stowed position.

The instructions may include instructions to move the arm to the deployed position in response to detecting that the seat assembly is occupied.

The instructions may include instructions to move the arm to the stowed position in response to detecting that a latch plate is engaged with a buckle of the seat assembly.

The first webbing guide may abut the second webbing guide with the arm at the stowed position.

The second webbing guide may be seat-rearward of a front surface of the seatback with the arm at the stowed position.

With reference to the Figures, wherein like numerals indicate like parts throughout the several views, a vehicle 20 with a seat assembly 22 is shown. The seat assembly 22 includes a seatback 24 having a top end 26. The seat assembly 22 includes an arm 28 supported by the seatback 24. The arm 28 is movable from a stowed position to a deployed position. The seat assembly 22 includes a first webbing guide 30a, 30b supported by the seatback 24 at the top end 26. The seat assembly 22 includes a second webbing guide 32 fixed to and movable with the arm 28. The second webbing guide 32 is at the top end 26 of the seatback 24 with the arm 28 at the stowed position. The second webbing guide 32 is spaced from the seatback 24 in a seat-forward direction FD with the arm 28 at the deployed position. The seat assembly 22 includes a retractor 34 supported by the seatback 24 at the top end 26. The seat assembly 22 includes a webbing 36 extending from the retractor 34 through the first webbing guide 30a, 30b and the second webbing guide 32. Movement of the arm 28 from the stowed position to the deployed position may present the webbing 36 to an occupant of the seat assembly 22.

Figure 1:
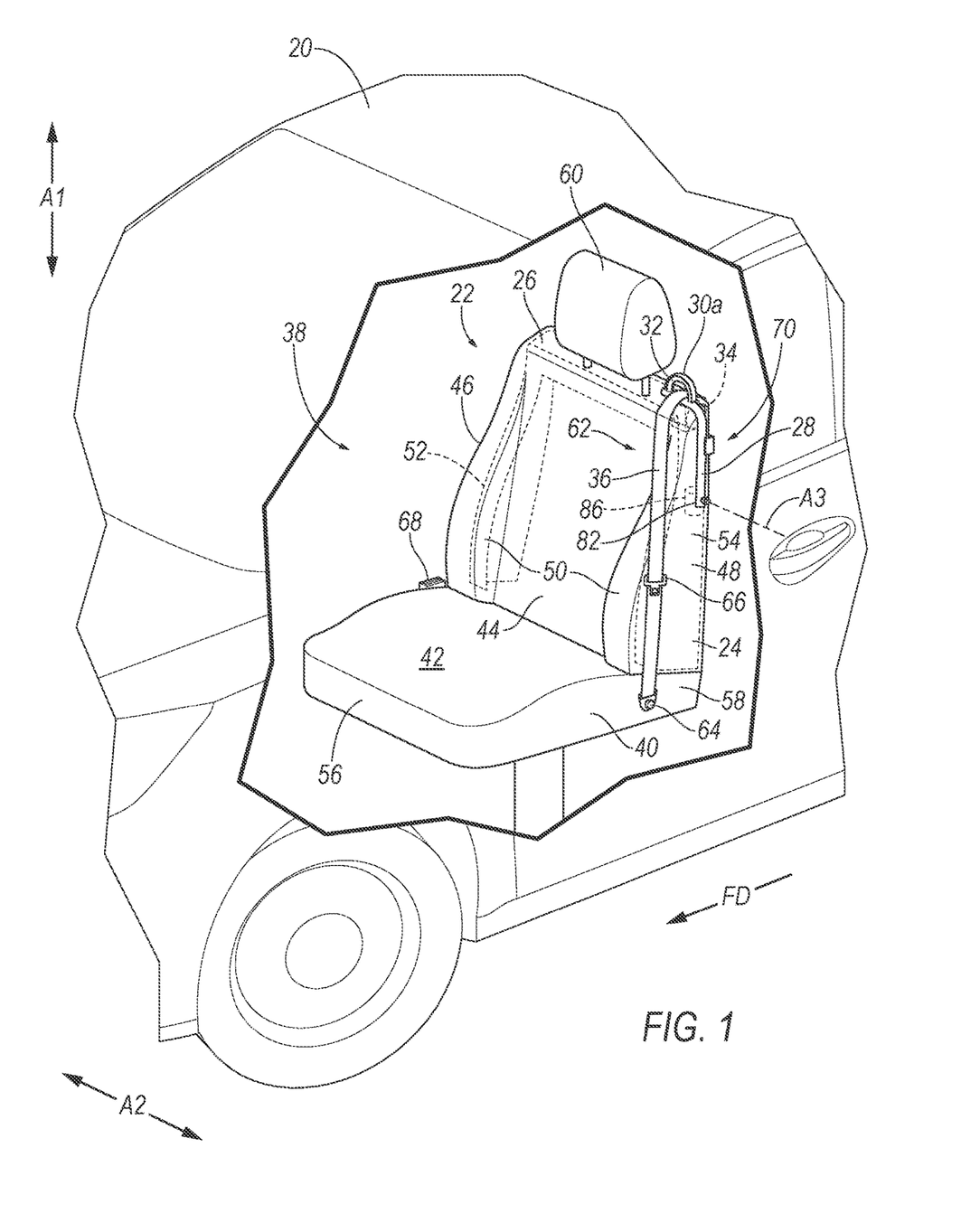
FIG. 1 is a perspective view a portion of a vehicle with a seat assembly.

With reference to FIG. 1, the vehicle 20 may be any suitable type of ground vehicle, e.g., a passenger or commercial automobile such as a sedan, a coupe, a truck, a sport utility, a crossover, a van, a minivan, a taxi, a bus, etc.

The vehicle 20 may define a passenger cabin 38 to house occupants, if any, of the vehicle 20. The passenger cabin 38 may extend across the vehicle 20, e.g., from a left side of the vehicle 20 to a right side of the vehicle 20. The passenger cabin 38 includes a front end and a rear end with the front end being in front of the rear end during forward movement of the vehicle 20.

One or more seat assemblies 22 may be supported in the passenger cabin 38, e.g., by a floor of the vehicle 20. It is contemplated that technology and the regulatory framework may evolve in the future to where use of rotatable seat assemblies becomes safe and permissible and, under such circumstances, the seat assemblies 22 may be rotatably supported by the floor to be selectively rotated to face in different directions of the passenger cabin 38, e.g., the front end, the rear end, the right side, the left side, etc. In such examples in which the future regulatory and technology evolution allows for safe and permissible use of seat assemblies 22 that are selectively rotatable to different facing positions, the seatbelt assembly 62 may be a seat-integrated restraint (SIR) in which the components of the seatbelt assembly 62 are fixed to the seat assembly 22. For example, the retractor 34 and an anchor 64 may be fixed to the seatback 24 and/or a seat bottom 40 of the seat assembly 22 such that the retractor 34 and the anchor 64 rotate with seatback 24 and the seat bottom 40 as the seat assembly 22 is selectively rotated relative to the floor to face in different directions.

The seat assemblies 22 may be supported via a pivot assembly or other suitable structure that allows rotation of the seat assembly 22, including conventional structures. Each seat assembly 22 includes the seatback 24 and the seat bottom 40 that can support the occupant of the seat assembly 22. For example, the occupant of the seat assembly 22 may sit atop a top surface 42 of the seat bottom 40 and recline against the seatback 24.

The seatback 24 has the top end 26 and a bottom end 44. The bottom end 44 is at, e.g., abuts, the seat bottom 40. The top end 26 is spaced from, e.g., distal to, the seat bottom 40. In other words, the top end 26 and the bottom end 44 are opposite ends, with the top end 26 above the bottom end 44 along a seat-vertical axis A1. The seatback 24 includes a first side 46 and a second side 48 spaced from each other along a seat-lateral axis A2. The seat-lateral axis A2 is perpendicular to the seat-vertical axis A1. For example, the first side 46 may be at a right of the occupant seated in the seat assembly 22, and the second side 48 may be at a left of the occupant.

The seatback 24 may include side bolsters 50. The side bolsters 50 may extend in the seat-forward direction FD, e.g., one on the first side 46 and one on the second side 48 of the seatback 24. The side bolsters 50 may support the occupant, e.g., resisting movement along the seat-lateral axis A2. The side bolsters 50 may nest the occupant between the side bolsters 50. The side bolsters 50 may abut sides of the occupant.

The seatback 24, including the side bolsters 50, may include a seatback frame 52. The seatback frame 52 may include tubes, beams, etc. Specifically, the seatback frame 52 may include a pair of upright frame members. The upright frame members are elongated, and specifically, are elongated in a generally upright direction (e.g., along the seat-vertical axis A1) when the seatback 24 is in a generally upright position. The upright frame members are spaced from each other along the seat-lateral axis A2. The seatback frame 52 may include one or more cross-members extending between the upright frame members. The seatback frame 52, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame 52 may be formed of a suitable metal, e.g., steel, aluminum, etc. The seatback 24, including the side bolsters 50, can include a cover 54. The cover 54 may include upholstery and padding. The upholstery may be cloth, leather, faux leather, or any other suitable material. The upholstery may be stitched in panels around the frame 52. The padding may be between the upholstery and the frame 52. The padding may be foam or any other suitable material.

The seat bottom 40 has a front end 56 and a rear end 58. The front end 56 is seat-forward of the rear end 58 in the seat-forward direction FD. The seat bottom 40 can include a frame (not shown). The frame may include tubes, beams, etc. Specifically, the frame may include a pair of frame members elongated in the seat-forward direction FD SF, e.g., between the front end 56 and the rear end 58 of the seat bottom 40. The frame members are spaced from each other along a seat-lateral axis A2. The frame may include cross-members extending between the frame members. The cross-members may be elongated along the seat-lateral axis A2. The frame can include a seat pan. The seat pan may be generally planar and extend from one of the frame members to the other of the frame members, e.g., along seat-lateral axis A2. The seat pan may be fixed to the frame members. The frame, including the frame members, the cross-members, and the seat pan may be of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc. The seat bottom 40 can include a cover. The cover may include upholstery and padding. The upholstery may be cloth, leather, faux leather, or any other suitable material. The upholstery may be stitched in panels around the frame. The padding may be between the upholstery and the frame. The padding may be foam or any other suitable material.

The seatback 24 is supported by the seat bottom 40 at the rear end 58. The seat bottom 40 extends from the seatback 24 in the seat-forward direction FD of the seat assembly 22. The rear end 58 is proximate to the seatback 24 and the front end 56 is distal from the seatback 24. The seatback 24 may be stationary or movable relative to the seat bottom 40. The seatback 24 and the seat bottom 40 may be adjustable in multiple degrees of freedom. Specifically, the seatback 24 and the seat bottom 40 may themselves be adjustable, in other words, adjustable components within the seatback 24 and/or the seat bottom 40, and/or may be adjustable relative to each other.

The seat assembly 22 may include a head restraint 60. The head restraint 60 may be supported by the seatback 24. The head restraint 60 may be at the top end 26 of the seatback 24.

The head restraint 60 may be stationary or movable relative to the seatback 24. The seatback 24 and the head restraint 60 may be adjustable in multiple degrees of freedom. Specifically, the seatback 24 and/or the head restraint 60 may themselves be adjustable and/or may be adjustable relative to each other.

Each seat assembly 22 may include a seatbelt assembly 62. As set forth above, it is contemplated that future regulatory and technology evolution may allow for safe and permissible use of seat assemblies 22 that are selectively rotatable to different facing positions, and in such examples, the seatbelt assembly 62 may be a seat-integrated restraint (SIR) in which various components of the seatbelt assembly 62, e.g., the retractor 34 and the anchor 64, are fixed to the seat assembly 22.

The seatbelt assembly 62 includes the retractor 34 and the webbing 36. The webbing 36 is retractably payable from the retractor 34. The seatbelt assembly 62 may include the anchor 64 fixed to the webbing 36 and a latch plate 66 that engages a buckle 68. The webbing 36 may extend continuously from the retractor 34 to the anchor 64. The latch plate 66 may slide freely along the webbing 36, and, when engaged with the buckle 68 divide the webbing 36 into a lap belt and a shoulder belt. The webbing 36 may be fabric, e.g., polyester. In the example in which the seatbelt assembly 62 is an SIR, as described above, the anchor 64 may be directly connected to the seatback 24 or the seat bottom 40.

The retractor 34 provides payout and retraction of the webbing 36, e.g., via rotation of a spool of the retractor 34 in one direction or another. The retractor 34 may include a frame that supports the spool and other components of the retractor 34. The spool may be rotatably supported by the frame. In other words, the spool may rotate relative to the frame in one direction or another. The webbing 36 may be wound around the spool. The webbing 36 may be fixed to the spool, e.g., in any suitable manner. The retractor 34 may include a return spring that urges rotation of the spool in the direction that retracts the webbing 36. The return spring may be loaded in tension or compression when the webbing 36 is fully retracted, and the return spring may be further loaded in either tension or compression when the webbing 36 is extended from the spool. The return spring may be, for example, a spiral torsion return spring or any other suitable type of return spring. The retractor 34 may include a locking device operatively coupled between the spool and the frame to control movement of the spool relative to the frame. The locking device is movable from an unlocked position in which torque is not transferred from the spool to the frame, to a locked position in which torque is transferred from the spool to the frame. The locking device may include an inertia clutch that moves the locking device from the unlocked position to the locked position in response to a change in inertia. For example, the inertia clutch may include one or more pawls. Centrifugal force from an increase in rotation speed of the spool, e.g., when a certain load is applied to the webbing 36, may urge the pawls radially outward to the locked position. As another example, the locking device may be moved from the unlocked position to the locked position in response to deceleration of the vehicle 20, e.g., a sudden slowing, sudden stop, impact, etc., of the vehicle 20. The locking device may be moved from the unlocked position to the locked position in response to an activation sensor. The activation sensor senses sudden deceleration of the vehicle 20 and triggers activation of the locking device, i.e., moves the locking device to the locked position. The locking device may include any suitable structure for selectively transferring torque, e.g., including conventional structures.

In examples in which the seatbelt assembly 62 is an SIR for a seat assembly 62 that is selectively rotatable to face different directions in examples in which contemplated future regulatory and technology evolution allows for such use, as described above, the retractor 34 may be supported by the seatback 24. In other words, in such examples, the weight of the retractor 34 is borne by the seatback 24, and more specifically the seatback frame 52. For example, the frame of the retractor 34 may be fixed to the frame 52 of the seatback 24 via weld, fastener, or other suitable structure. The retractor 34 may be supported by the seatback 24 at the top end 26. For example, the retractor 34 may be supported by the seatback 24 above the side bolster 50 at the first side 46 or the second side 48 of the seatback 24. The retractor 34 may be adjacent to the head restraint 60 along the seat-lateral axis A2.

Figure 2A:
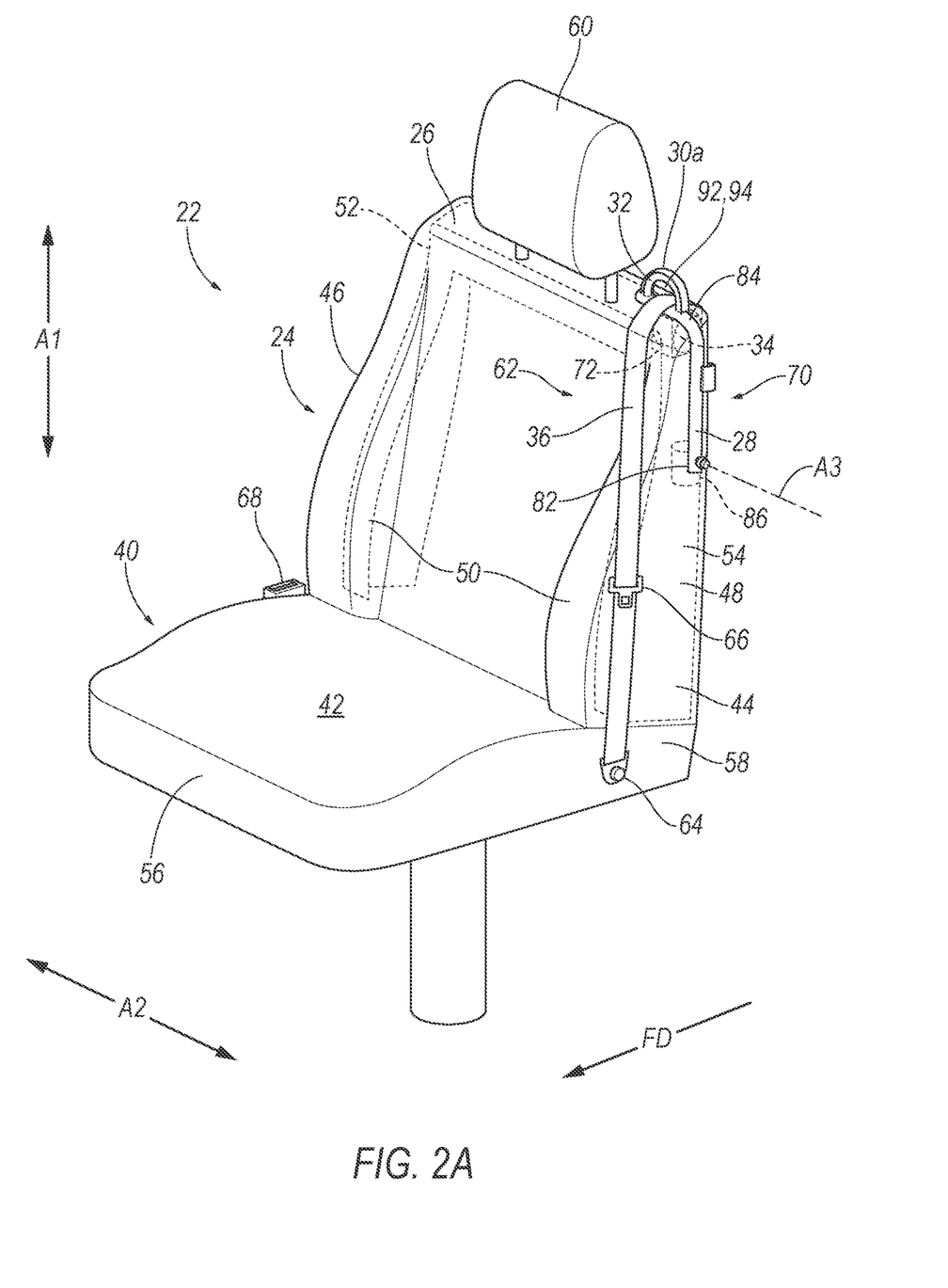
FIG. 2A is a perspective view the seat assembly with a first webbing guide and an arm supporting a second webbing guide, the arm in a stowed position.
Figure 2B:
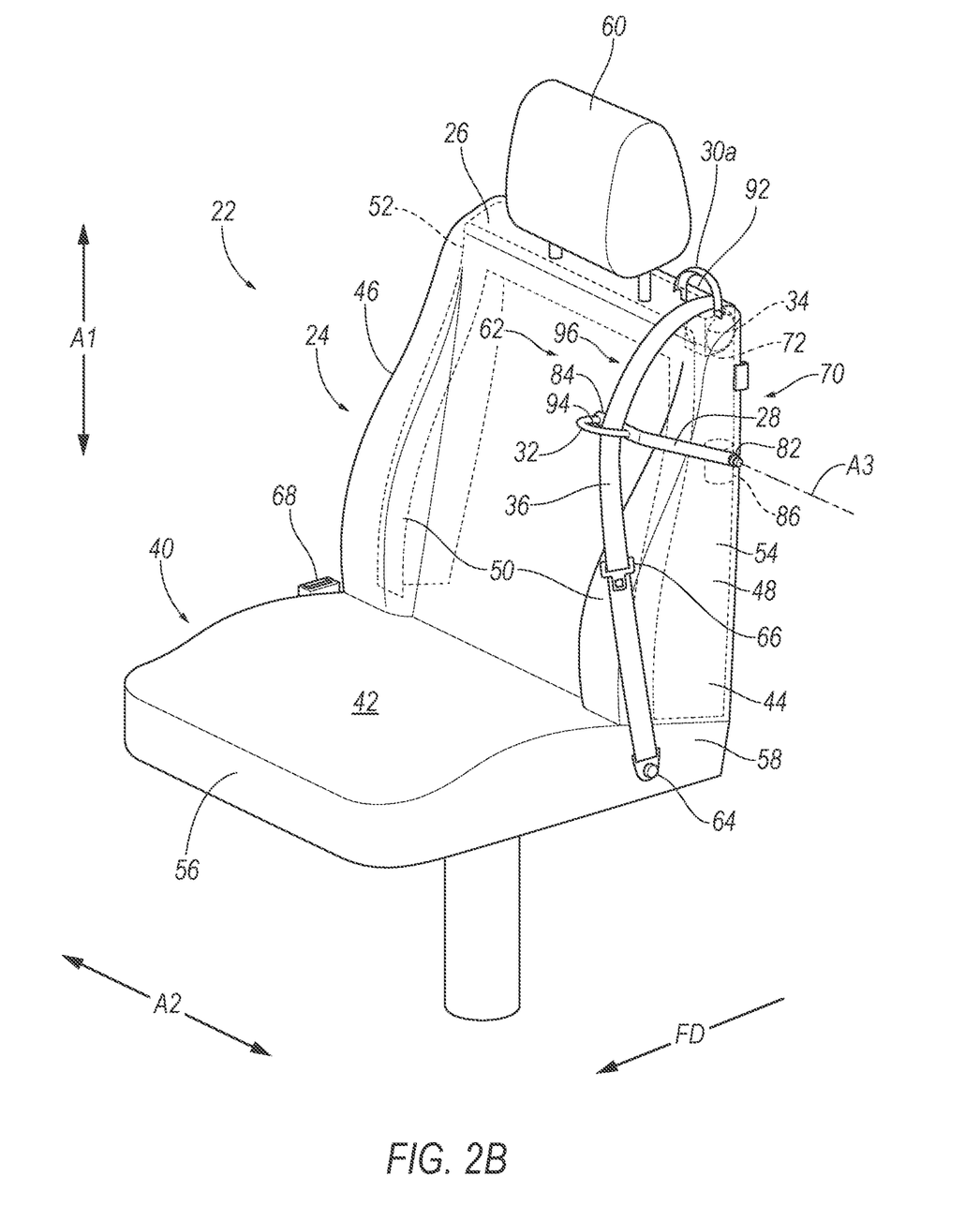
FIG. 2B is a perspective view the seat assembly of FIG. 2 with the arm in a deployed position.
Figure 3A:
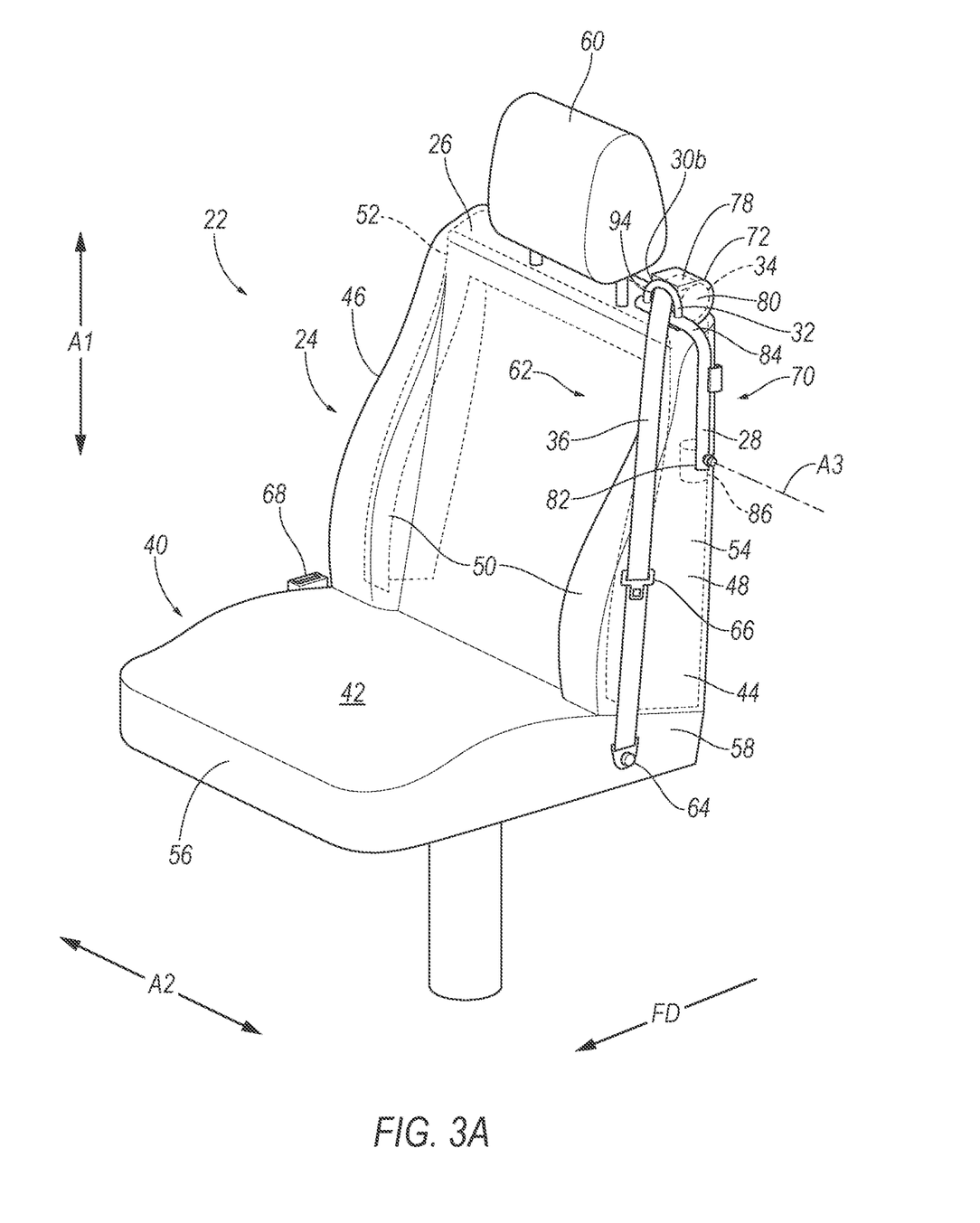
FIG. 3A is a perspective view of the seat assembly with another first webbing guide and the arm in the stowed position.
Figure 3B:
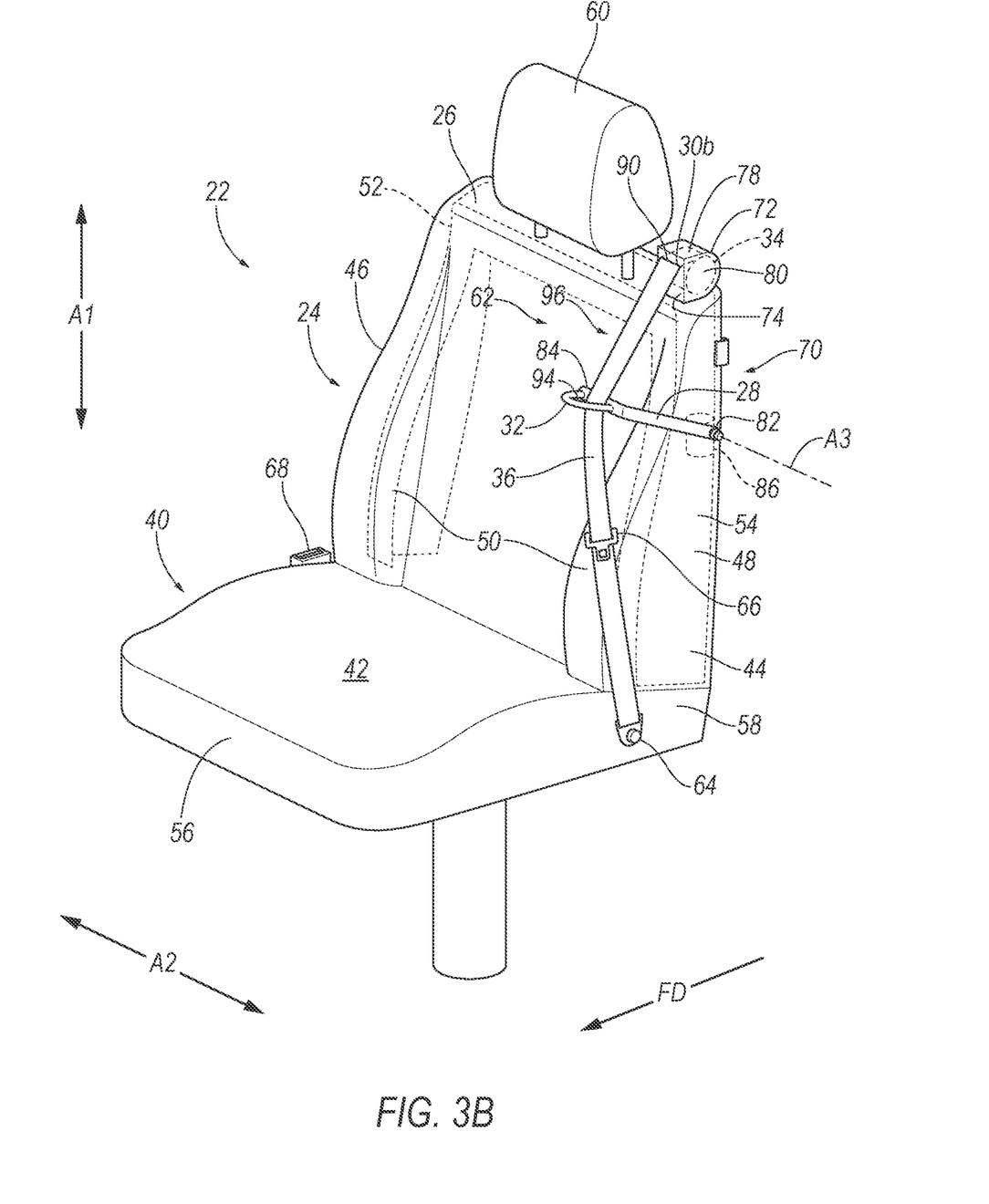
FIG. 3B is a perspective view the seat assembly of FIG. 4 with the arm in a deployed position.

With reference to FIGS. 2A and 2B, the retractor 34 may be internal of the cover 54. In other words, the cover 54 of the seatback 24 may enclose the retractor 34. For example, the retractor 34 may be between the cover 54 and the frame 52 of the seatback 24. The cover 54 may include a slit or other opening perming, e.g., at a rear of the seatback 24, permitting the webbing 36 to extend from internal to external of the cover 54. With reference to FIGS. 3A and 3B, the retractor 34 may be external of the cover 54. In other words, the cover 54 of the seatback 24 may not enclose the retractor 34. For example, the cover 54 may be between the retractor 34 and the frame 52 of the seatback 24.

The seat assembly 22 may include a housing 72 for the retractor 34. The housing 72 may be supported by the supported by the seatback 24, e.g., at the top end 26 internal of the cover 54 (as shown in FIGS. 2A and 2B) or at the top end 26 external of the cover 54 (as shown in FIGS. 3A and 3B). The housing 72 may be fixed to the frame 52 of the seatback 24 and/or the frame of the retractor 34, e.g., via fastener or other suitable structure. The housing 72 encloses the retractor 34. For example, the housing 72 may include a front panel 74, a top panel 78, side panels 80, etc., that collectively surround the retractor 34. The panels 74, 78, 80 may be fixed to the frame 52 of the seatback 24, the frame of the retractor 34 and/or to each other. The housing 72 may be plastic or any suitable material. The housing 72 may be external of the cover 54. The housing 72 may include a class-A surface, i.e., a finished surface exposed to view by a customer and free of unaesthetic blemishes and defects.

The seat assembly 22 includes the arm 28 to assist the occupant of the seat assembly 22 when fastening the seatbelt assembly 62. The arm 28 may be elongated between a first distal end 82 and a second distal end 84 opposite the first distal end 82. The arm 28 is supported by the seatback 24. The first distal end 82 of the arm 28 may be operatively coupled to frame 52 of the seatback 24 via a pivot or other suitable structure that secures the arm 28 to the frame 52 of the seatback 24 and permits relative movement, e.g., rotation, therebetween. The arm 28 is outboard of the side bolster 50 along the seat-lateral axis A2. In other words, the arm 28 may be farther from a center of the seatback 24 than the side bolster 50 along the seat-lateral axis A2. To put it another way, the side bolster 50 may be between the arm 28 and the center of the seatback 24 along the seat-lateral axis A2. Having the arm 28 outboard of the side bolster 50 reduces inference between motion the arm 28 and the occupant of the seat, e.g., relative to having the arm 28 at, or inboard of, the side bolster 50. The arm 28 is external of the cover 54. In other words, the cover 54 may be between the frame 52 of the seatback 24 and the arm 28.

The arm 28 is movable from the stowed position, shown in FIGS. 2A and 3A, to the deployed position, shown in FIGS. 2B and 3B. The arm 28 may rotate, e.g., about an axis A3 that is parallel to the seat-lateral axis A2, between the stowed position and the deployed position. The second distal end 84 of the arm 28 at the stowed position may be at the top end 26 of the seatback 24. The second distal end 84 of the arm 28 at the deployed position may be spaced from the seatback 24 in the seat-forward direction FD.

The seat assembly 22 may include an actuator 86 configured to move the arm 28 from the stowed position to the deployed position and vice versa. The actuator 86 may include a motor, reduction gears, belts, pulleys, or any suitable structure for moving the arm 28, including conventional structures. For example, the actuator 86 may be a rotary servomotor. The actuator 86 may move the arm 28 from the stowed position to the deployed position, or from the deployed position to the stowed position, in response to receiving a command from a computer 88, e.g., specifying the stowed position or the deployed position. The actuator 86 may be supported by the seatback 24. For example, the actuator 86 may be fixed to the frame 52 of the seatback 24, e.g., via fastener, bracket, etc.

The first webbing guide 30a, 30b positions the webbing 36 relative to the seatback 24, e.g., at the top end 26 of the seatback 24. The first webbing guide 30a, 30b is supported by the seatback 24 at the top end 26, e.g., adjacent to the head restraint 60 and above the side bolster 50. The first webbing guide 30a, 30b may be fixed to the frame 52 of the seatback 24. For example, and with reference to FIGS. 2A and 2B, the first webbing guide 30b may extend upward from the seatback 24 and define an opening 92. The webbing 36 is slidable within the first webbing guide 30a, 30b, e.g., through the slot 90 or the opening 92. As another example, and with reference to FIGS. 3A and 3B, the front panel 74 of the housing 72 may include the first webbing guide 30a. The first webbing guide 30a may include a slot 90 defined by the front panel 74 of the housing 72. The slot 90 may be elongated along the seat-lateral axis A2. The first webbing guide 30a, 30b may be plastic, metal, or any suitable material.

The second webbing guide 32 positions the webbing 36 relative to the arm 28, e.g., at the second distal end 84. The second webbing guide 32 extends inboard from the arm 28 toward the center of the seat assembly 22. The second webbing guide 32 may overlap the side bolster 50 and/or the first webbing guide 30a, 30b along the seat-lateral axis A2. The second webbing guide 32 may define an opening 94. The opening 94 of the second webbing guide 32 may be a slot elongated along the seat-lateral axis A2, or any suitable shape. The webbing 36 is slidable within the second webbing guide 32, e.g., through the opening 94. The second webbing guide 32 is fixed to the arm 28, e.g., via fastener, weld, etc. The arm 28 and the second webbing guide 32 may be unitary. Unitary means a single, uniform piece of material with no seams, joints, fasteners, or adhesives holding it together, i.e., formed together simultaneously as a single continuous unit, e.g., by molding, stamping, machining from a single blank, etc. Non-unitary components, in contrast, are formed separately and subsequently assembled, e.g., with fasteners, welding, etc.

The second webbing 36 is movable with the arm 28 from the stowed position to the deployed position, and vice versa. With reference to FIGS. 2A and 3A, the second webbing guide 32 may be at the top end 26 of the seatback 24 with the arm 28 at the stowed position. The second webbing guide 32 may be seat-rearward of a front surface of the seatback 24 with the arm 28 at the stowed position. In other words, the second webbing guide 32 may be between the front surface of the seatback 24 and the first webbing guide 30a, 30b along the seat-forward direction FD. The front surface of the seatback 24 is between the side bolster 50 and may be reclined against by an occupant of the seat assembly 22. For example, the webbing guide at the stowed position may be above the side bolster 50 and adjacent the head restraint 60. The first webbing guide 30a, 30b abuts the second webbing guide 32 with the arm 28 at the stowed position. For example, a rear surface of the second webbing guide 32 at the stowed position may contact a front surface of the first webbing guide 30a. 30b, e.g., a front surface of the front panel 74. The first webbing guide 30a. 30b is aligned with the second webbing guide 32 with the arm 28 at the stowed position. For example, a perimeter of the slot 90 or opening 92 of the first webbing guide 30a. 30b may be centered relative to a perimeter of the opening 94 of the second webbing guide 32 along the seat-lateral axis A2 and the seat-vertical axis A1. With reference to FIGS. 2B and 3B, the second webbing guide 32 is spaced from the seatback 24 in the seat-forward direction FD with the arm 28 at the deployed position. The spacing between the second webbing guide 32 and the seatback 24 moves the webbing 36 away from the seatback 24 and creates a gap 96 there between. The gap 96 between the webbing 36 and the seatback 24 may position the webbing 36 in a more convenient location, e.g., when the occupant buckles the seatbelt assembly 62 and compared to having the webbing 36 continuously abut the seatback 24.

The webbing 36 extends from the retractor 34 through the first webbing guide 30a, 30b and the second webbing guide 32. For example, and with refence to FIGS. 3A and 3B, the webbing 36 may extend from the retractor 34 in the seat-forward direction FD through the slot 90 of the first webbing guide 30a, 30b. As another example, and with refence to FIGS. 2A and 2B, the webbing 36 may extend upward from the retractor 34 behind the seat and through the opening 94 of the first webbing guide 30a, 30b from behind to in front of the seatback 24. After extending through the first webbing guide 30a. 30b, the webbing 36 may extend through the opening 94 of the second webbing guide 32, e.g., downward to the anchor 64.

Figure 4:
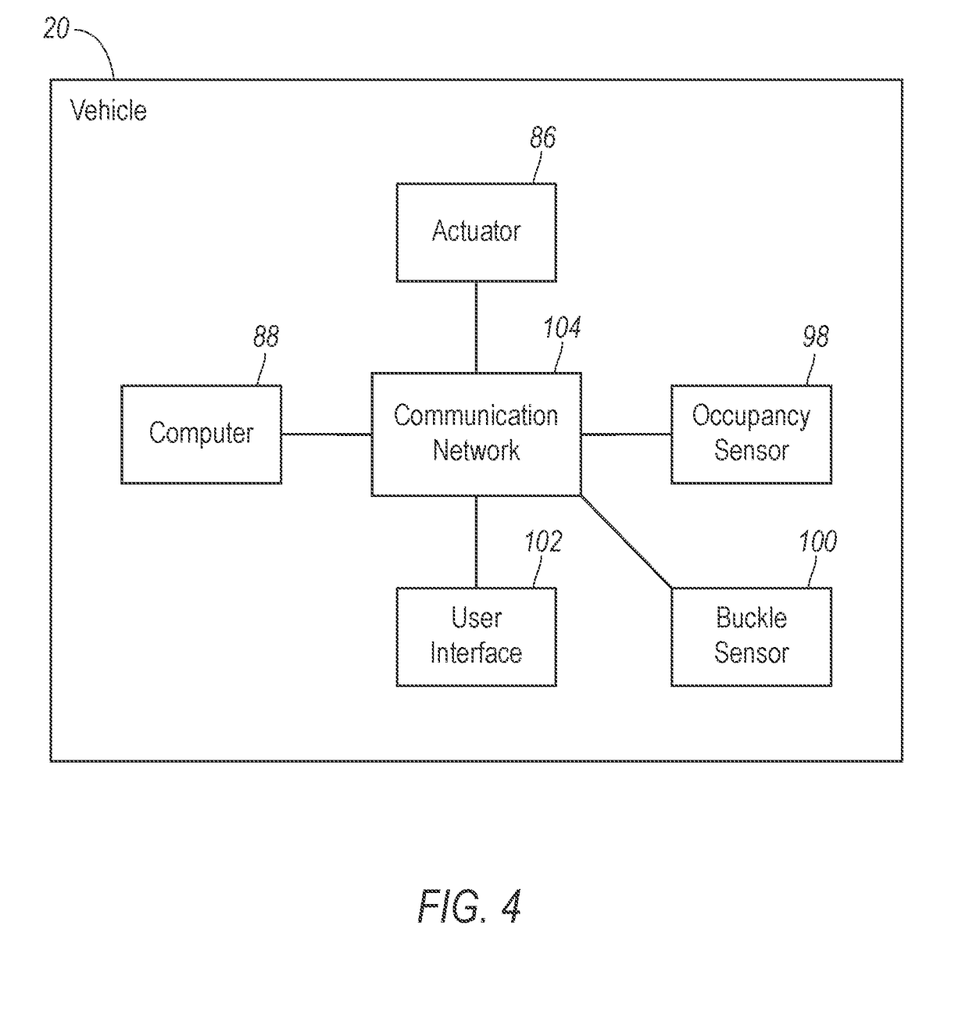
FIG. 4 is a block diagram of components of the vehicle.

With reference to FIG. 4, the vehicle 20 may include an occupancy sensor 98 configured to detect occupancy of the seat assembly 22. The occupancy sensor 98 may include visible-light or infrared cameras directed at the seat, weight sensors supported by the seat bottom 40, or other suitable structure, including those conventionally known. The occupancy sensor 98 provides data to the computer 88 specifying whether the seat assembly 22 is occupied or unoccupied.

The vehicle 20 may include a buckle sensor 100 that detects engagement of the latch plate 66 of the seatbelt assembly 62 with the buckle 68. The buckle sensor 100 may include a switch, a contact sensor, a hall effect sensor, or any other suitable structure for detecting engagement of the latch plate 66 with the buckle 68, including convention structures. The buckle sensor 100 provides data to the computer 88 specifying whether the latch plate 66 is engaged with, or disengaged from, the buckle 68.

The vehicle 20 may include a user interface 102. The user interface 102 presents information to and receives information from an occupant of the vehicle 20. The user interface 102 may be located, e.g., on the instrument panel in a passenger cabin 38 of the vehicle 20, or wherever may be readily accessed by the occupant. The user interface 102 may include dials, digital readouts, screens such as a touch-sensitive display screen, speakers, and so on for providing information to the occupant, e.g., human-machine interface (HMI) elements. The user interface 102 may include buttons, knobs, keypads, microphone, and so on for receiving information from the occupant. The user interface 102 may be in communication with the computer 88.

The vehicle 20 may include a communication network 104. The communication network 104 includes hardware, such as a communication bus, for facilitating communication among vehicle 20 components, e.g., the computer 88, the occupancy sensor 98, the buckle sensor 100, the user interface 102, etc. The communication network 104 may facilitate wired or wireless communication among the vehicle 20 components in accordance with a number of communication protocols such as controller area network (CAN), Ethernet, WiFi, Local Interconnect Network (LIN), and/or other wired or wireless mechanisms. Alternatively or additionally, in cases where the computer 88 comprises a plurality of devices, the communication network 104 may be used for communications between devices represented as the computer 88 in this disclosure.

The computer 88 may be a microprocessor-based computer implemented via circuits, chips, or other electronic components. The computer 88 includes a processor, a memory, etc. The memory of the computer 88 may include memory for storing programming instructions executable by the processor as well as for electronically storing data and/or databases. For example, the computer 88 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 88 may be a restraints control module. In another example, computer 88 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 88. The memory can be of any type, e.g., hard disk drives, solid state drives, servers, or any volatile or non-volatile media. The memory can store the collected data sent from the sensors.

The computer 88 is programmed to, i.e., the memory stores instructions executable by the processor to, command the actuator 86 to move the arm 28 from the stowed position to the deployed position, and to move the arm 28 from the deployed position to the stowed position. The computer 88 may move the arm 28 by transmitting a command to the actuator 86 via the communication network 104. The command may specify the stowed position or the deployed position.

The computer 88 may be programmed to move the arm 28 to the deployed position in response to detecting that the seat assembly 22 is occupied. The computer 88 may determine that the seat assembly 22 is occupied based on information received from the occupancy sensor 98 via the communication network 104. For example, upon receiving information from the occupancy sensor 98 indicating that the seat assembly 22 has gone from being unoccupied to being occupied, the computer 88 may transmit a command to the actuator 86 specifying movement of the arm 28 to the deployed position.

The computer 88 may be programmed to move the arm 28 to the stowed position in response to detecting that the latch plate 66 is engaged with the buckle 68 of the seat assembly 22. The computer 88 may determine that the latch plate 66 is engaged with the buckle 68 based on information received from the buckle sensor 100 via the communication network 104. For example, upon receiving information from the buckle sensor 100 indicating that the latch plate 66 has gone from being disengaged from the buckle 68 to engaged with the buckle 68, the computer 88 may transmit a command to the actuator 86 specifying movement of the arm 28 to the stowed position.

The computer 88 may be programmed to move the arm 28 to the deployed position or the stowed position in response to receiving an instruction from the user interface 102 via the communication network 104. The instruction may specify the stowed position or the deployed position. The user interface 102 may transmit the instruction in response to an input by the occupant, or other user, to the user interface 102 indicating the stowed position or the deployed position.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The adjectives first, second, etc., are used throughout this document as identifiers and, unless explicitly stated otherwise, are not intended to signify importance, order, or quantity.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seat assembly, comprising:
   a seatback having a top end;
   an arm supported by the seatback and movable from a stowed position to a deployed position;
   a first webbing guide supported by the seatback at the top end;
   a second webbing guide fixed to and movable with the arm, the second webbing guide being at the top end of the seatback when the arm is at the stowed position, and the second webbing guide being spaced from the seatback in a seat-forward direction when the arm is at the deployed position;
   a retractor supported by the seatback at the top end; and
   a webbing extending from the retractor through the first webbing guide and the second webbing guide.

2. The seat assembly of claim 1, wherein the seatback has a side bolster, and wherein the arm is outboard of the side bolster.

3. The seat assembly of claim 1, wherein the seatback includes a cover, and wherein the arm and the retractor are external of the cover.

4. The seat assembly of claim 1, further comprising a housing supported by the seatback at the top end and enclosing the retractor, the housing having a front panel that includes the first webbing guide.

5. The seat assembly of claim 1, further comprising an actuator supported by the seatback, the actuator configured to move the arm.

6. The seat assembly of claim 5, further comprising a computer having a processor and a memory storing instructions executable by the processor to command the actuator to move the arm from the stowed position to the deployed position and from the deployed position to the stowed position.

7. The seat assembly of claim 6, wherein the instructions include instructions to move the arm to the deployed position in response to detecting that the seat assembly is occupied.

8. The seat assembly of claim 6, wherein the instructions include instructions to move the arm to the stowed position in response to detecting that a latch plate is engaged with a buckle of the seat assembly.

9. The seat assembly of claim 8, wherein the first webbing guide abuts the second webbing guide with the arm at the stowed position.

10. The seat assembly of claim 9, wherein the first webbing guide is aligned with the second webbing guide with the arm at the stowed position.

11. A seat assembly, comprising:
    a seatback having a side bolster and a top end;
    an arm supported by the seatback, the arm being outboard of the side bolster and movable from a stowed position to a deployed position;
    a retractor supported by the seatback;
    a first webbing guide supported by the seatback at the top end;
    a second webbing guide fixed to and movable with the arm, the second webbing guide being at the top end of the seatback with the arm at the stowed position, and the second webbing guide being spaced from the seatback in a seat-forward direction with the arm at the deployed position; and
    a webbing extending from the retractor through the first webbing guide and the second webbing guide.

12. The seat assembly of claim 11, wherein the seatback includes a cover and the retractor is internal of the cover.

13. The seat assembly of claim 11, wherein the seatback includes a cover and the retractor is external of the cover.

14. The seat assembly of claim 11, further comprising a housing supported by the seatback and enclosing the retractor, the housing having a front panel that includes the first webbing guide.

15. The seat assembly of claim 11, further comprising an actuator supported by the seatback, the actuator configured to move the arm.

16. The seat assembly of claim 15, further comprising a computer having a processor and a memory storing instructions executable by the processor to command the actuator to move the arm from the stowed position to the deployed position and from the deployed position to the stowed position.

17. The seat assembly of claim 16, wherein the instructions include instructions to move the arm to the deployed position in response to detecting that the seat assembly is occupied.

18. The seat assembly of claim 16, wherein the instructions include instructions to move the arm to the stowed position in response to detecting that a latch plate is engaged with a buckle of the seat assembly.

19. The seat assembly of claim 11, wherein the first webbing guide abuts the second webbing guide with the arm at the stowed position.

20. The seat assembly of claim 11, wherein the second webbing guide is seat-rearward of a front surface of the seatback with the arm at the stowed position.

* * * * *